United States Patent
Evans et al.

(10) Patent No.: US 8,914,545 B2
(45) Date of Patent: Dec. 16, 2014

(54) SYSTEMS AND METHODS FOR LOSSLESS COMPRESSION OF DATA AND HIGH SPEED MANIPULATION THEREOF

(75) Inventors: Richard A. Evans, Sandy, UT (US); Glen E. Graf, Highlands Ranch, CO (US); Joseph Lesko, Peoria, AZ (US); John G. McDonald, Eugene, OR (US); Christina L. Richards, Scottsdale, AZ (US)

(73) Assignee: III Holdings 1, LLC, Wilmington, DE (US)

( * ) Notice: Subject to any disclaimer, the term of this patent is extended or adjusted under 35 U.S.C. 154(b) by 165 days.

(21) Appl. No.: 13/591,013

(22) Filed: Aug. 21, 2012

(65) Prior Publication Data

US 2012/0316961 A1    Dec. 13, 2012

Related U.S. Application Data

(63) Continuation-in-part of application No. 13/095,679, filed on Apr. 27, 2011, now Pat. No. 8,412,849.

(51) Int. Cl.
*G06Q 30/02* (2012.01)
*H03M 7/00* (2006.01)

(52) U.S. Cl.
CPC ..................... *H03M 7/00* (2013.01)
USPC ....................................... 709/247

(58) Field of Classification Search
USPC ....................................... 709/247
See application file for complete search history.

(56) References Cited

U.S. PATENT DOCUMENTS

| 8,412,849 B2 | 4/2013 | Lesko et al. |
| 2002/0196167 A1 | 12/2002 | Sun |
| 2005/0268341 A1 | 12/2005 | Ross |
| 2007/0109155 A1 | 5/2007 | Fallon |
| 2007/0233823 A1 | 10/2007 | Traub et al. |
| 2009/0113076 A1 | 4/2009 | Long |
| 2009/0319549 A1 | 12/2009 | Millett |
| 2010/0262536 A1* | 10/2010 | Barrett et al. .................. 705/38 |

OTHER PUBLICATIONS

International Preliminary Report on Patentability dated Apr. 18, 2013 in Application No. PCT/US2012/035406.
Notice of Allowance dated Dec. 24, 2012 in U.S. Appl. No. 13/095,679.
International Search Report and Written Opinion dated Jul. 13, 2012 in Application No. PCT/US2012/035406.

* cited by examiner

*Primary Examiner* — Tu Nguyen

(57) ABSTRACT

The present disclosure includes a system, method, and article of manufacture for lossless compression of data and high speed manipulation of the data. The method may comprise associating a customer with a plurality of levels, and counting, in near real time, a number of transactions at each level in the plurality of levels based on a transaction history of the customer at each of a plurality of merchants. The method may further comprise counting the number of transactions during a time period. Similarly, the method may comprise determining an opportunity comprising an offer based upon the counting, determining an opportunity based upon a count indicating a transaction by the customer with a merchant, and/or determining an opportunity with a first merchant based upon a count indicating a transaction by the customer with a second merchant.

20 Claims, 9 Drawing Sheets

Figure 3

| Entity Cross-Reference Table | | |
|---|---|---|
| Entity | Base 10 | Binary |
| A | 1 | 000001 |
| B | 2 | 000010 |
| C | 4 | 000100 |
| D | 8 | 001000 |
| E | 16 | 010000 |
| F | 32 | 100000 |

Figure 4

| Collections Table | | |
|---|---|---|
| Collection | Base 10 | Binary |
| C1 | 15 | 001111 |
| C2 | 7 | 000111 |
| C3 | 19 | 010011 |
| C4 | 32 | 100000 |
| C5 | 7 | 000111 |

Figure 5

| Monthly Summary Table | | | | |
|---|---|---|---|---|
| Collection | Day 1 | Day 2 | ... | Day M |
| C1 | 000101101010 | 011111111000 | ... | 011101101001 |
| C2 | 000101110100 | 011101100111 | ... | 001111101110 |
| C3 | 111011010100 | 111011011000 | ... | 110100111000 |
| C4 | 001011101011 | 101011001001 | ... | 000000011110 |
| C5 | 010101010101 | 001101001110 | ... | 110011111011 |

Figure 6

| Summary Collections Table | | |
|---|---|---|
| Collection | Used | Assigned |
| C1 | 11011011101 | 00010001001 |
| C2 | 00110011111 | 00110011111 |
| C3 | 11110111000 | 11110110000 |
| C4 | 11011011110 | 11011111100 |
| C5 | 11011000010 | 01101100001 |

Figure 8A

| Level Cross-Reference Table ||
|---|---|
| Level | Unique Value |
| Level 1 | 1 |
| Level 2 | 2 |
| Level 3 | 3 |
| Level 4 | 4 |
| Level 5 | 5 |
| Level 6 | 6 |

Figure 8B

| Level Cross-Reference Table ||
|---|---|
| Level | Unique Value |
| None attempted and none granted | 00 |
| None attempted and read granted | 01 |
| Read attempted and read granted | 11 |
| None attempted and write granted | 02 |
| Read attempted and write granted | 12 |
| Write attempted and write granted | 22 |

Figure 9

| Level Data Collections Table ||
|---|---|
| Collection | Level Data Array |
| C1 | 0\|0\|3\|5\|0\|2 |
| C2 | 2\|0\|0\|3\|3\|1 |
| C3 | 5\|0\|0\|0\|2\|5 |
| C4 | 1\|0\|0\|1\|2\|2 |
| C5 | 3\|3\|2\|2\|1\|2 |

Figure 10

| Monthly Level Data Collections Table | | | | |
|---|---|---|---|---|
| Collection | Day_1 | Day_2 | ... | Day_M |
| C1 | 0\|0\|3\|5\|0\|2 | 2\|2\|2\|3\|2\|5 | ... | 3\|3\|2\|5\|5\|5 |
| C2 | 2\|0\|0\|3\|3\|1 | 1\|1\|5\|2\|3\|4 | ... | 1\|2\|1\|2\|1\|2 |
| C3 | 5\|0\|0\|0\|2\|5 | 2\|2\|5\|5\|4\|2 | ... | 3\|2\|3\|5\|5\|4 |
| C4 | 1\|0\|0\|1\|2\|2 | 1\|1\|1\|2\|5\|5 | ... | 2\|2\|3\|4\|4\|4 |
| C5 | 3\|3\|2\|2\|1\|2 | 3\|3\|2\|3\|3\|2 | ... | 5\|5\|5\|1\|1\|4 |

Figure 11

| Summary Level Data Collections Table | |
|---|---|
| Collection | Maximum Levels for Month |
| C1 | 5\|3\|3\|5\|4\|5 |
| C2 | 3\|3\|5\|5\|4\|5 |
| C3 | 5\|3\|5\|5\|3\|5 |
| C4 | 2\|3\|3\|5\|5\|2 |
| C5 | 3\|3\|4\|5\|2\|5 |

Figure 12

| Risk Level Cross-Reference Table | |
|---|---|
| Level | Unique Value |
| Risk_Level_1 | 1 |
| Risk_Level_2 | 2 |
| Risk_Level_3 | 3 |
| Risk_Level_4 | 4 |
| Risk_Level_5 | 5 |
| Risk_Level_6 | 6 |
| Risk_Level_7 | 7 |
| Risk_Level_8 | 8 |
| Risk_Level_9 | 9 |

Figure 13

| Risk Level Data Collections Table | |
|---|---|
| Collection | Level Data Array |
| C1 | 1\|1\|2\|1\|5\|1 |
| C2 | 9\|2\|1\|3\|2\|2 |
| C3 | 2\|2\|1\|5\|1\|3 |
| C4 | 1\|1\|2\|1\|3\|6 |
| C5 | 2\|2\|5\|7\|8\|3 |

Figure 14

| Monthly Risk Level Transaction Count Table | | | | |
|---|---|---|---|---|
| Collection | Day 1 | Day 2 | ... | Day M |
| C1 | 22\|10\|46\|80\|99\|22 | 29\|29\|27\|93\|62\|59 | ... | 93\|34\|28\|54\|53\|58 |
| C2 | 73\|97\|90\|83\|73\|91 | 17\|17\|57\|27\|39\|44 | ... | 19\|29\|12\|21\|99\|24 |
| C3 | 51\|40\|50\|60\|92\|95 | 27\|72\|75\|56\|45\|21 | ... | 73\|72\|83\|95\|55\|84 |
| C4 | 91\|70\|50\|81\|92\|72 | 19\|11\|15\|24\|55\|59 | ... | 27\|92\|53\|54\|44\|74 |
| C5 | 93\|73\|82\|62\|81\|72 | 37\|31\|22\|39\|37\|27 | ... | 95\|45\|85\|51\|61\|74 |

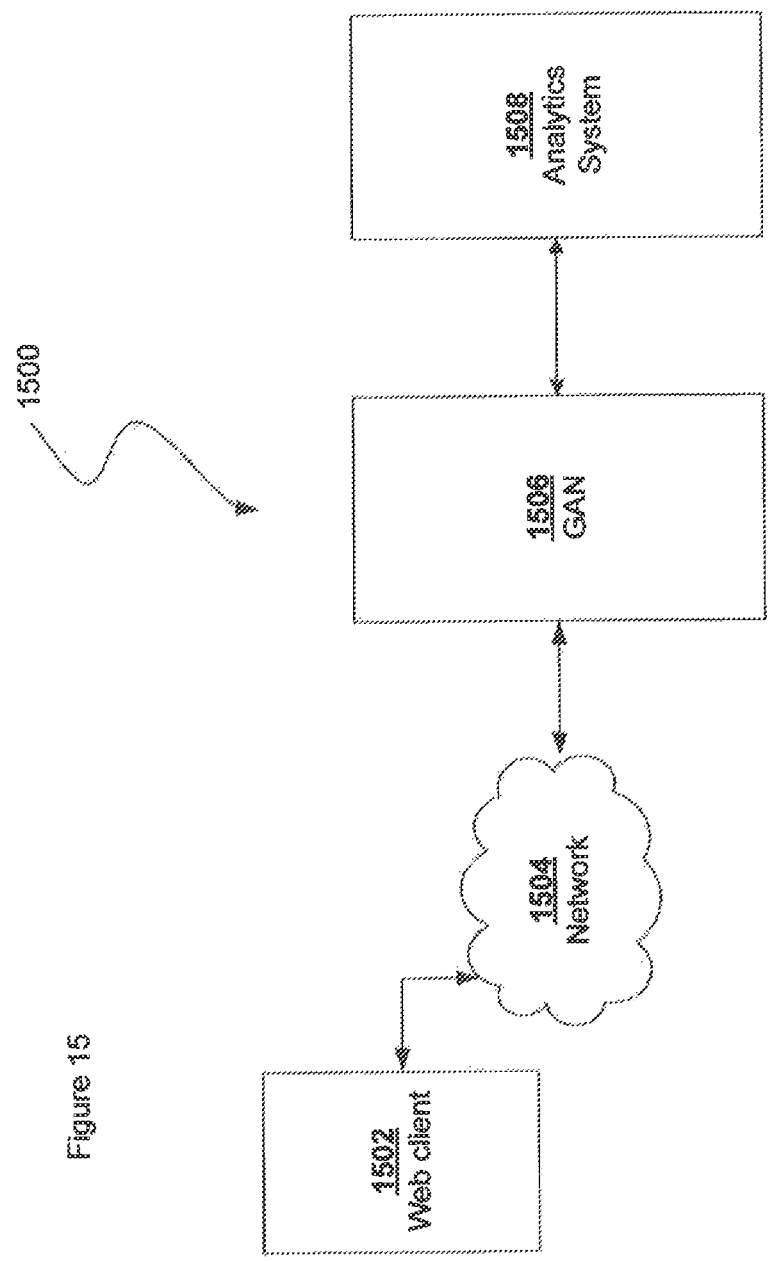

| Daily Customer Spend Events by Merchant and Purchase Level | | | | | |
|---|---|---|---|---|---|
| Customer | | day_1<br>M1 ... M7 M8 ... Mx | day_2<br>M1 ... M7 M8 ... Mx | ... | day_m<br>M1 ... M7 M8 ... Mx |
| Cust1 | L<br>M<br>H | 0\|...\|1\|1\|...\|0<br>0\|...\|0\|0\|...\|0<br>1\|...\|1\|0\|...\|0 | 0\|...\|0\|0\|...\|0<br>0\|...\|0\|0\|...\|0<br>0\|...\|0\|0\|...\|0 | ... | 0\|...\|0\|0\|...\|1<br>0\|...\|0\|0\|...\|1<br>0\|...\|1\|1\|...\|0 |
| Cust2 | L<br>M<br>H | 0\|...\|0\|0\|...\|0<br>0\|...\|0\|0\|...\|0<br>0\|...\|0\|0\|...\|0 | 0\|...\|1\|0\|...\|0<br>0\|...\|0\|0\|...\|0<br>0\|...\|0\|0\|...\|0 | ... | 0\|...\|0\|0\|...\|0<br>0\|...\|0\|0\|...\|0<br>0\|...\|0\|0\|...\|0 |
| Cust3 | L<br>M<br>H | 1\|...\|1\|1\|...\|0<br>1\|...\|0\|0\|...\|0<br>1\|...\|1\|0\|...\|0 | 0\|...\|1\|1\|...\|0<br>0\|...\|0\|0\|...\|0<br>1\|...\|1\|0\|...\|0 | ... | 0\|...\|1\|1\|...\|0<br>0\|...\|0\|0\|...\|0<br>1\|...\|1\|0\|...\|0 |
| ... | | ... | ... | ... | ... |

| Monthly Customer Spend Event Counts by Merchant and Purchase Level | | |
|---|---|---|
| Customer | | Monthly Totals<br>M1 ... M7 M8 ... Mx |
| Cust1 | L<br>M<br>H | 00\|...\|10\|01\|...\|03<br>00\|...\|00\|19\|...\|05<br>01\|...\|12\|03\|...\|05 |
| Cust2 | L<br>M<br>H | 00\|...\|01\|00\|...\|00<br>00\|...\|00\|00\|...\|00<br>00\|...\|00\|00\|...\|00 |
| Cust3 | L<br>M<br>H | 00\|...\|00\|14\|...\|01<br>00\|...\|00\|00\|...\|07<br>30\|...\|10\|01\|...\|04 |
| ... | | ... |

SYSTEMS AND METHODS FOR LOSSLESS COMPRESSION OF DATA AND HIGH SPEED MANIPULATION THEREOF

CROSS REFERENCE TO RELATED APPLICATIONS

This application is a continuation in part of, and claims priority to and the benefit of, U.S. Ser. No. 13/095,679 filed on Apr. 27, 2011 and entitled "SYSTEMS AND METHODS FOR LOSSLESS COMPRESSION OF DATA AND HIGH SPEED MANIPULATION THEREOF," Which is incorporated by reference herein in its entirety.

BACKGROUND

1. Field

The present disclosure generally relates to compression of data, and more particularly, to lossless compression of data and high speed manipulation thereof.

2. Related Art

There are many instances in which it is advantageous to inquire into the activity and/or attributes associated with a particular individual (e.g., a computer user, a transaction account holder, a consumer, and the like). For example, many organizations sometimes go to great expense to remain apprised of the network activities of their employees. That is, a large number of organizations often expend a large amount of money and time determining which websites/domains their employees surf (an activity), which network permissions their employees may be assigned (an attribute), and the like. Similarly, many organizations (e.g., sales organizations, transaction account issuers or payment processors, and the like) may utilize information associated with, for example, the browsing activities and/or transaction histories of their customers to better tailor content (e.g., offers, opportunities, rewards, and the like) to those customers.

In the past, the size and complexity of such data has limited the speed and efficiency with which this data may be analyzed or processed. For example, where an organization wishes to track a website that an employee visits and/or a database of each permission assigned to each employee, the processing and memory requirements may escalate rapidly, particularly where there are a large number of employees surfing to a large number of websites, or a large number of employees associated with a particular permission or group of permissions (only some of which may be necessary for the performance of the employee's assignments). Similarly, where a transaction account issuer or payment processor wishes to analyze, for example, transaction history data associated with its customers, often the complexity and quantity of this data may again give rise to rapidly escalating processing and memory requirements.

Accordingly, systems and methods capable of rapidly and inexpensively compressing and manipulating large amounts of data (e.g., data comprising an employee's activity or attributes on or within a network, transaction history, and the like) are desirable and would be of great advantage to a large number of organizations and businesses. In particular, solutions that reduce memory and processing requirements may be very advantageous.

SUMMARY

The present disclosure includes a system, method, and article of manufacture for lossless compression of data and high speed manipulation of data. The method may comprise associating a customer with a plurality of levels and/or merchants, where a number of transactions associated with one or more spend levels (e.g., high, medium, low) at each merchant may be counted (in near real time) for the customer. In various embodiments, the method may further comprise counting the number of transactions during a time period. Similarly, the method may comprise determining an opportunity comprising an offer based upon the counting, determining an opportunity based upon a count indicating a transaction by the customer with a merchant, determining an opportunity with a first merchant based upon a count indicating a transaction by the customer with a second merchant, determining a loyalty opportunity with a merchant based upon a count indicating a transaction by the customer with the merchant during a time period, and/or determining an opportunity with a merchant based upon a count and an indication by the customer that the customer is visiting the merchant.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

FIG. 3 shows an exemplary entity cross-reference table, in accordance with various embodiments.

FIG. 4 shows an exemplary collections table, with the binary representation showing the entities included in each collection, in accordance with various embodiments.

FIG. 5 shows an exemplary monthly summary table for some period of time, e.g., days of the month, and the associated entities for each collection, in accordance with various embodiments.

FIG. 6 shows an exemplary summary collections table including used and assigned entity data, in accordance with various embodiments.

FIG. 8A shows an exemplary level cross-reference table, in accordance with various embodiments.

FIG. 8B shows an exemplary level cross-reference table, in accordance with various embodiments.

FIG. 9 shows an exemplary level data collections table, in accordance with various embodiments.

FIG. 10 shows an exemplary monthly level data collections table for some period of time, e.g., days of the month, in accordance with various embodiments.

FIG. 11 shows an exemplary summary level data collections table with the maximum values that occurred during the given period of time, in accordance with various embodiments.

FIG. 12 shows an exemplary risk level cross-reference table, in accordance with various embodiments.

FIG. 13 shows an exemplary risk level data collections table, in accordance with various embodiments.

FIG. 14 shows an exemplary risk level transaction count table, where the $n^{th}$ array element holds the associated count for the $n^{th}$ entity in the binary representation of the entities in the collection, in accordance with various embodiments.

FIG. 15 shows an exemplary diagram in which a transaction is processed and/or analyzed, in accordance with various embodiments.

FIG. 16 shows an exemplary table with daily customer spend events organized by merchant and purchase level, in accordance with various embodiments.

FIG. 17 shows an exemplary table with monthly customer spend event counts organized by merchant and purchase level, in accordance with various embodiments.

DETAILED DESCRIPTION

Figure 1:
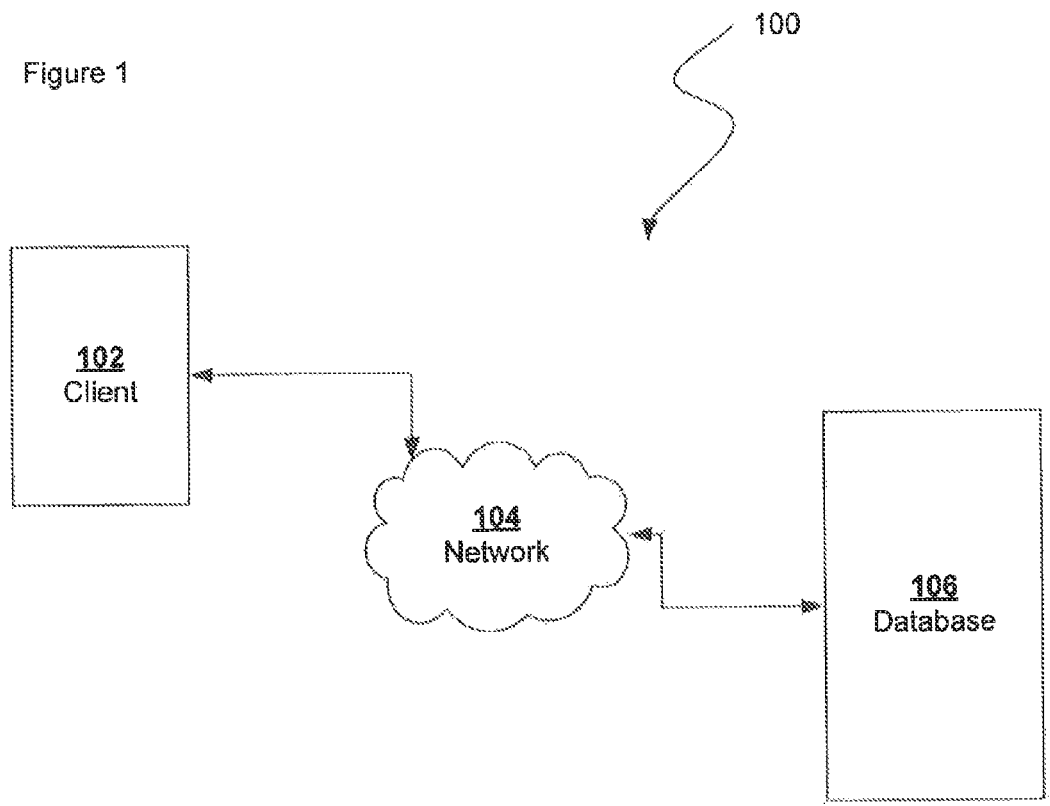
FIG. 1 shows an exemplary system diagram in Which an individual may interact or interface with an organization, in accordance with various embodiments.

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, account holder, cardmember or the like shall include any person, entity, business, government organization, business, software, hardware, machine associated with a transaction account, buys merchant offerings offered by one or more merchants using the account and/or who is legally designated for performing transactions on the account, regardless of Whether a physical card is associated with the account. For example, the cardmember may include a transaction account owner, an transaction account user, an account affiliate, a child account user, a subsidiary account user, a beneficiary of an account, a custodian of an account, and/or any other person or entity affiliated or associated with a transaction account. In addition, as used herein, a user may comprise, in various embodiments, any person who interacts and/or interfaces with a computer system (e.g., an organizational and/or an employer computer system).

As used herein, the phrases "real time," "near real time," "pseudo real time," "quasi real time," and the like may mean any period of time during which a table or data structure, as described herein, is analyzed or processed. For example, in various embodiments, any of these terms may mean a period of time immediately following and/or shortly following a transaction, an event, an occurrence, and the like. In various embodiments, the period of time may include a period of picoseconds, nanoseconds, microseconds, milliseconds, seconds, minutes, hours, days, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A system, method and/or computer program product for lossless compression of data is disclosed. The data may be manipulated in a compressed state very efficiently and at high speed. Referring broadly to FIGS. 1 and 15, exemplary systems 100 and 1500 for lossless compression and high-speed efficient manipulation of data are disclosed. Further, in various embodiments, system 100 may represent or illustrate a system through Which an employer or organization and an employee or individual interact, while in various embodiments, system 1500 may represent or illustrate a system for processing and/or analyzing a transaction history (e.g., a history of payment transactions and/or an activity history of a user and/or system).

With particular reference to FIG. 1, system 100 may comprise a web client 102, a network 104, and/or a database 106. In an exemplary embodiment, system 100 may comprise a mainframe system and/or a single distributed system.

A web client 102 includes any device (e.g., personal computer, point of sale or POS device) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, mobile phones, smart phones, personal digital assistants, set-top boxes, workstations, computer-servers, main frame computers, mini-computers. PC servers, pervasive computers, network sets of computers, personal computers, such as WADS, iMACs, and MacBooks, kiosks, terminals, point of sale (POS) devices and/or terminals, televisions, or any other device capable of receiving data over a network. A web-client 102 may run Microsoft Internet Explorer, Mozilla Firefox, Google Chrome, Apple Safari, or any other of the myriad software packages available for browsing the internet.

Practitioners will appreciate that a web client 102 may or may not be in direct contact with an application server. For example, a web client 102 may access the services of an application server through another server and/or hardware component, which may have a direct or indirect connection to an Internet server. For example, a web client 102 may communicate with an application server via a load balancer. In an exemplary embodiment, access is through a network or the Internet through a commercially-available web-browser software package.

As those skilled in the art will appreciate, a web client 102 includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client 102 may include any suitable personal computer, network computer, workstation, personal digital assistant, cellular phone, smart phone, minicomputer, mainframe or the like. A web client 102 can be anywhere there is any type of wireless network connectivity (e.g., in a home or business environment with access to a network). In an exemplary embodiment, access is through a network or the Internet through a commercially available web-browser software package. A web client 102 may implement security protocols such as Secure Sockets Layer (SSL) and Transport Layer Security (TLS). A web client 102 may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app. In various embodiments, a micro-app may be made available as a service.

As used herein, network 104 includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE, PALM PILOT, BLACKBERRY), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk. IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks. ISDN, Digital Subscriber Line (DSL), or various wireless communication methods, see, e.g., Gilbert Held, Understanding Data Communications (1996), Which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National institute of Standards and Technology) definition of cloud computing at http://csrc.nist.gov/publications/nistpubs/800-145/SP800-145.pdf (last visited June 2012), which is hereby incorporated by reference in its entirety.

Database 106 may comprise any type of hardware and/or software (e.g., a computer server) configured or configurable to store data and/or host a database. For example, database 106 may comprise a server appliance running a suitable server operating system (e.g., IIS) and having database software (e.g., SQL Server 2008, an Oracle database, and the like), stored thereon. Database 106 may, in various embodiments, compress and/or analyze data, as described herein. Similarly, in various embodiments, database 106 may be coupled to a system for analyzing and/or compressing data, as described herein.

With particular reference to FIG. 15, system 1500 may comprise a client 1502, a network 1504, a global authorization network ("GAN") 1506, and/or an analytics system 1508.

In various embodiments, web client 1502 may comprise a client similar or identical to web client 102, as described above. For example, in various embodiments, client 1502 may comprise a personal computer, a mobile computer, a mobile phone, a POS device, and the like.

Similarly, in various embodiments, network 1504 may comprise a network similar or identical to network 104, as described above. Further, in various embodiments, network 1504 may comprise an inbound acquiring network associated with a financial institution or other transaction account issuer or manager.

In various embodiments, GAN 1506 may comprise a system (e.g., a front end or initial authorization system) capable of or configured to perform all or part of an authorization process in relation to a payment transaction associated with a transaction account.

In various embodiments, analytics system 1508 may comprise a system (e.g., a back end or secondary authorization system) capable of or configured to perform all or part of an authorization process in relation to a payment transaction associated with a transaction account. For example, analytics system 1508 may comprise a card authorization system ("CAS").

Referring broadly now to FIGS. 2-14 and 16-17, the process flows, logical representations, and/or screen shots depicted are merely embodiments and are not intended to limit the scope of the disclosure. For example, the steps recited in any of the method or process descriptions may be executed in any order and may, in various embodiments, apply to the systems 100 and/or 1500 depicted, respectively, in FIGS. 1 and 15. It will be appreciated that the following description makes appropriate references not only to the steps depicted in FIGS. 2-14 and 16-17 but also to the various system components and/or logical representations as described above with reference to FIGS. 1 and 15.

Figure 2:
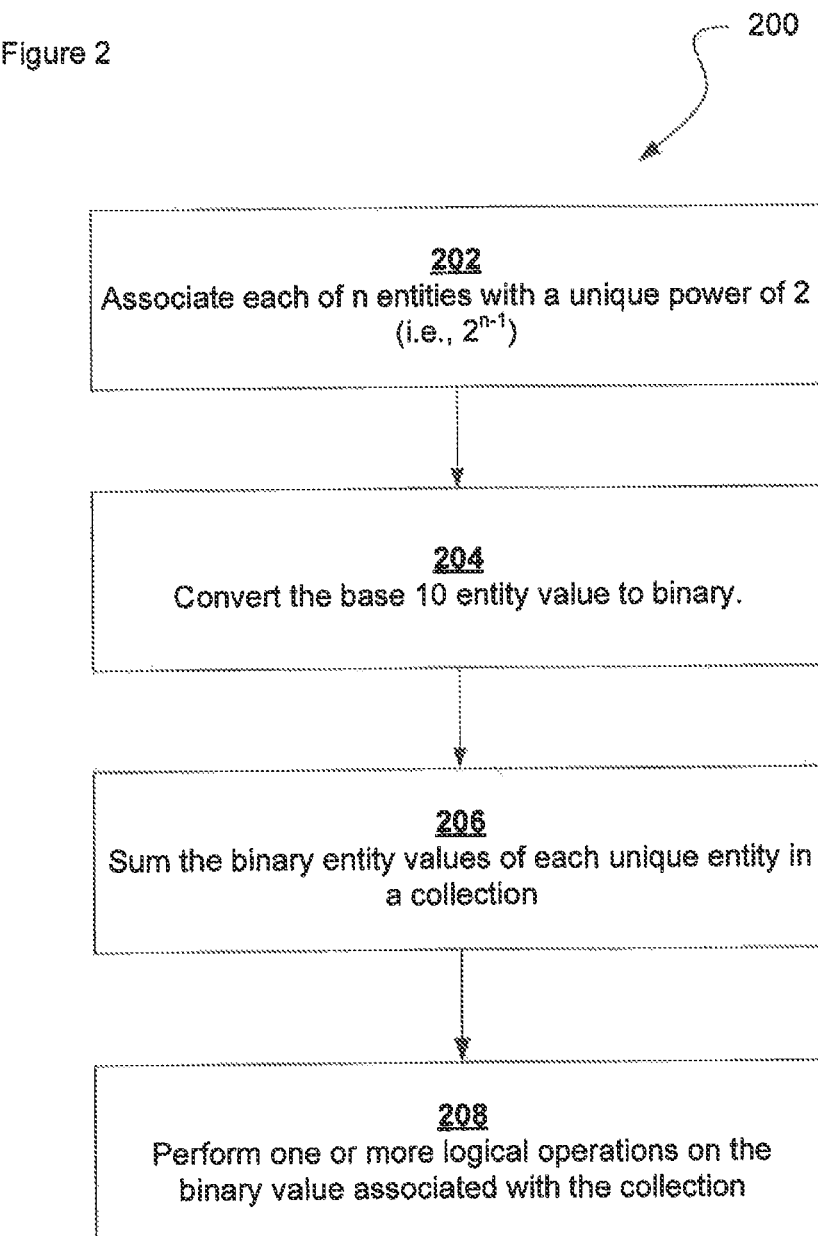
FIG. 2 shows a flowchart depicting an exemplary process for associating entities and collections with binary numbers, in accordance with various embodiments.

With reference now to FIG. 2, an exemplary process 200 for lossless compression and efficient manipulation of data is disclosed. As a primer, the following definitions apply.

Broadly, a "collection" may comprise a group or cluster of "entities," and an "entity" may comprise any element, part, or aspect of a collection. To clarify, although the foregoing definitions are not so limited, an entity may comprise any transaction, activity, occurrence, event, system, user, customer, consumer, merchant, attributes, and the like that may be associated with a collection, and a collection may comprise any group or cluster of transactions, activities, occurrences, events, systems, users, merchants, customers, consumers, attributes, and the like. Moreover, a collection may in one instance operate as an entity, and an entity, likewise, as a collection.

Take, for example, a collection comprising a user (a "user collection"). A variety of entities may be associated with the user collection; but, to take a single entity for purposes of illustration, a variety of transaction entities (e.g., visits to a website/domain or file access attempts) may be associated with the user collection. Thus, the user may comprise a collection of transaction entities. More particularly, in this case, the user collection may comprise one or more visits by the user to a website/domain or accesses by the user of a file.

However, and as mentioned above, a collection may in one instance operate as an entity, and the entity a collection. For example, a transaction entity (e.g., a website or a file) may operate as a collection, while a user may operate as an entity that accesses the website/file collection. Thus, in this example, the website or file may comprise a collection of user entities which have accessed the website or file collection.

Thus, the terms "entity" and "collection" may be, at the most basic level, defined by their relationship to one another. In other words, because a user may comprise a collection in one scenario, but an entity in another scenario, it is helpful to realize that the terms are best understood as a one-to-one, one-to-many, or many-to-many relationship between two interrelated data sets or elements.

Accordingly, and for purposes of illustration, several examples of collection-entity relationships are provided. In various embodiments, an entity may comprise one or more transactions, users, user activities, internet sites, internet proxy activities, systems, alerts from systems or processes, anti-virus activities, data leakage prevention events, system activities, and the like. Likewise, a collection may comprise, in various embodiments, any of the foregoing, including one or more users, user groups, transaction clusters, activities associated with one or more users, files, file permissions, system alerts, websites/domains, and the like.

Similarly, in various embodiments, a collection may comprise an individual or customer (e.g., a customer of a transaction account issuer), while an entity may comprise one or more merchants from whom the customer collection has made purchases. However, as described above, the collection-entity relationship between merchants and customers may be defined such that a merchant comprises a collection, while customers comprise entities.

With continuing reference to FIG. 2, an entity may be associated with a unique power of the number two (step 202). For example, six entities, labeled A, B, C, D, E, and F, may be associated with unique powers of two using the number two as the base and (n−1) as the exponent, or $2^{(n-1)}$, where n=1 to 6, in this example, but where n generally begins with the number one and increases until each entity is associated with a unique value. The value associated with each entity may be further converted to binary (step 204). Thus, where there are six entities, A through F, each entity may receive base 10 and binary values as follows:

A: $2^{(0)}$=1=000001
B: $2^{(1)}$=2=000010
C: $2^{(2)}$=4=000100
D: $2^{(3)}$=8=001000
E: $2^{(4)}$=16=010000
F: $2^{(5)}$=32=100000

Although a variety of mechanisms may be employed, in an embodiment, the relationships between each entity and its base 10 and/or binary value may be saved in a table or array, which may comprise a portion of a database (other mechanisms may include flat files, objects in an object oriented program, and the like). For example, database 106 may store these relationships as part of an entity cross-reference table, which is depicted in FIG. 3.

As stated, a collection may comprise a cluster, collection, and/or group of one or more entities. Thus, where there are, for example, five collections, C1, C2, C3, C4, and C5, each collection may include entities as follows:

C1: A, B, C, D
C2: A, B, C
C3: A, B, E
C4: F
C5: A, B, C

Like each entity, each collection C1-C5 may be associated with a base 10 and/or binary value. This may be accomplished by summing the base 10 values of each unique entity in a collection and converting those values to binary. In an embodiment, the binary values associated with each unique entity in a collection may be logically ORed to produce the same result (step 206). In the example above, the following results are obtained:

C1: A+B+C+D=1+2+4+8=15=001111
C2: A+B+C=1+2+4=7=000111
C3: A+B E=1+2+16=19=010011
C4: F=32=100000
C5: A+B+C=1+2+4=7=000111

As described above with reference to each entity value, each collection value may be stored in a database (e.g., database 106) as part of a collections table, which is depicted in FIG. 4.

At this point, in one embodiment, 512 unique entities (to pick a number solely for purposes of illustration) may be mapped uniquely using 512 bits, or 64 bytes. Assuming a period of 30 days at a rate of 500 entities per day per collection (e.g., a user collection performing up to 500 distinct transactions per day) and 20,000 collections (e.g., 20,000 users), only about 38 megabytes of storage are required to store all of the data generated for the entire month. Thus, the data is compressed, in that a fraction of the storage previously required to track a collection's entities is required by the systems and methods described herein. Moreover, the data is stored losslessly, because all of the information associated with a collection's entities is stored intact as set of binary values.

The unique numbering system described above gives rise to a variety of unique and useful results (step 208). For instance, if a collection has a same entity sum as another collection, those collections are identical. That is, observe that collections C2 and C5, which both comprise entities A, B, and C, are associated with a base 10 sum of 7, or a binary sum of 000111. Thus, a simple numerical comparison shows duplicate collections. Further, because computing devices are designed to process data in a binary format (as opposed to a character or character string format, or even a base 10 format), the comparison described above may be performed at very high speed. That is, no computationally intensive string matching is required with the disclosed system.

Observe further that any collection that is associated with a value of $2^{(n-1)}$ necessarily includes only a single entity (e.g., a collection associated with a value of 1, 2, 4, 8 . . . only includes the entity associated with that value). On the other hand, any collection that is not associated with a value of $2^{(n-1)}$ is not limited to a single entity, and may include entities in common with other collections. For example, with reference to collections C1 and C3, system 100 may use a logical AND operation to quickly determine that these collections share entities in common and, indeed, which entities are shared. The calculation is provided below:

$$001111(C1) \text{ AND } 010011(C3) = 000011(\text{Result})$$

Having reached this Result, system 100 may use the entity cross-reference table (depicted in FIG. 3) to determine that the Result contains entities A and B (as stated, A=00001 and B=000010). Thus, system 100 may quickly determine which entities a plurality of collections share in common. In addition, system 100 may associate an entity count with a plurality of collections, whereby system 100 may determine collections that are candidates for entity reduction/consolidation and/or likely include entities included in other collections. That is, collections with a high entity count may be more likely to share common entities.

From a practical standpoint, although many uses are possible, assume that a first and second collection comprise two different network user groups (e.g., group C1 and group C2). Assume further that these groups comprise a variety of network users (e.g., users A, B, and C). More particularly, assume:

Group C1: user A, user B, user C
Group C2: user A, user B

System 100 may determine, based upon the processes described above, that Groups C1 and C2 both include users A and B. A system or network administrator may use this information to collapse, remove, and/or delete group C2, particularly where the administrator is able to place user C in a different group (not shown). Thus, the disclosed system and method may, in an example, permit a system or network administrator to remove redundant or unnecessary user groups.

With further regard to the manner in which entities may be assigned a value, the speed at which system 100 operates may be further improved by calculating, prior to assigning each entity in a collection a value, the relative frequencies of each entity across a plurality of collections. Those entities that occur most commonly may be assigned lower values (e.g., 1 or 000001), while those entities that occur less commonly may be assigned higher values (e.g., 32 or 100000). In this way, long binary representations can be partitioned into subsets that enable faster logical operations. For example, using the 512 entity example above, frequent entities are placed in the low order bytes (i.e., to the right, as shown in the example). Searching (or updating) the collections for a given common entity can be completed by performing the logical AND (respectively OR) on only the right most bytes and not the full 64 byte blocks. In an embodiment, the binary encoding can be completed so that similar or related entities are "close" together in the binary representation. This too enables partitioning the binary representation for efficient searching and/or updates of similar or related entities. With reference to FIG. 4, further efficiencies may be achieved by including a field for the number of entities in the collection or several fields for the number of entities in each of the partitioned subsets.

The foregoing processes, tables, and/or computations may be enhanced in a variety of ways. For instance, a collection table may be enhanced to show periodic (e.g., hourly, daily, weekly, monthly, 90 day, annual, etc.) entity sums, in which case a collection may be evaluated more granularly. This is depicted at FIG. 5. With respect to FIG. 5, note that Day_M is merely intended to represent the final day in a period of days. So, if the period is one month, M may equal 28, 29, 30, or 31, depending upon the month and year. Moreover, where a period is very granular (e.g., hourly) a trending analysis may be performed by system 100 to show a real time (or almost or pseudo-real time/quasi-real time) behavior of one or more collections and/or entities.

In an embodiment, a collection table may include entries for entities "used" by a collection and entries for entities "assigned" to a collection. This enhancement may be helpful, in one example, to system administrators in determining whether a user collection is using all, fewer, or greater than the permissions entities that it (or he) is assigned. Table 6 shows this enhancement, and "used" and "assigned" may be merely illustrative and are not exclusive of other similar columns, such as "detected," for an alert or event, and "base events," where a collection comprises a group, such as a business unit within an organization.

Occasionally, it may be desirable to add granularity to the data stored for an entity. That is, it may be useful to know/determine more than whether an entity occurred or exists. For example, where an entity comprises a file, the method described above may enable determination of whether the file was accessed. Likewise, where an entity comprises a merchant (as described herein), the systems and methods described herein may enable determination of whether a customer made a purchase from the merchant. However, if it is important to know, for example, a type of file access (e.g., none, read, write, alter, control, update, etc.), a type or category of transaction that occurred with a particular merchant, and the like, additional tables and/or a different table structure may be helpful and/or useful. Hereinafter, such data may be tracked using "level" data, or simply "levels," depending upon the context in which the terms appear. As described herein, and for purposes of illustration, level data may include a type of file access (e.g., read, write, etc.), a type of transaction (e.g., a transaction of a first value, a transaction of a second value, a transaction with a merchant in a particular industry group, and the like). In certain embodiments, any number of levels may be associated with an entity, depending upon the nature of the entity (e.g., user entity, file entity, etc.) and the granularity and information desired.

Figure 7:
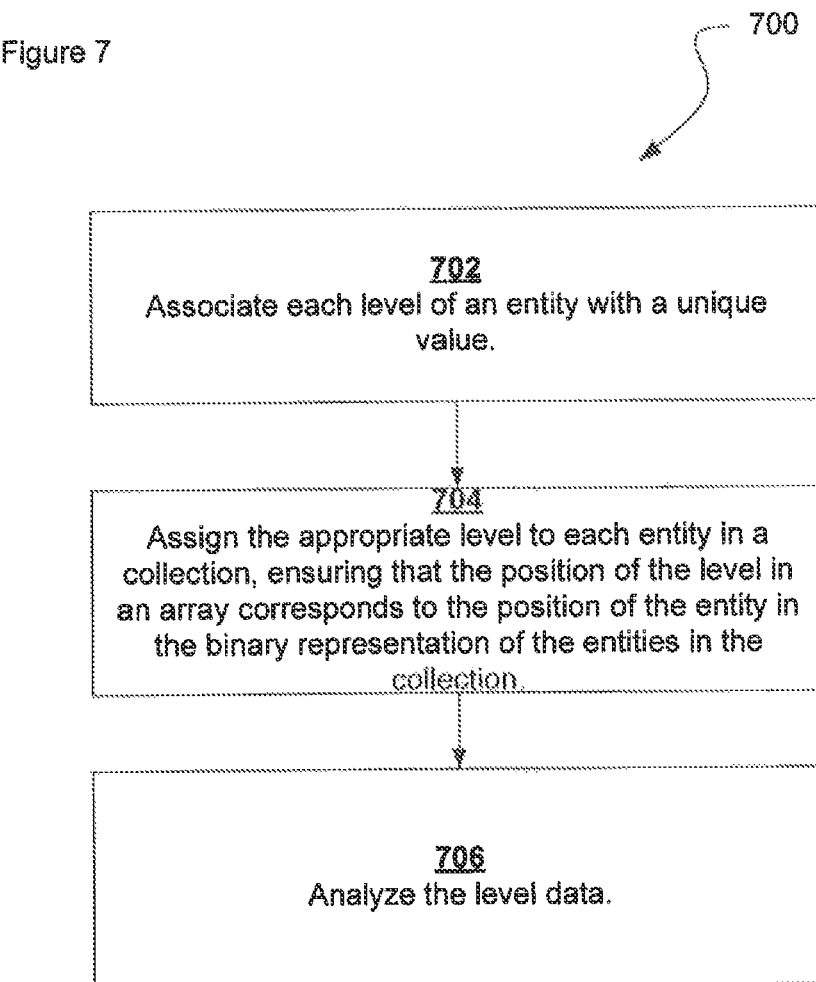
FIG. 7 shows a flowchart depicting an exemplary process for associating an entity with level data, in accordance with various embodiments.

With reference now to FIG. 7, a process 700 for associating level data with an entity is described. The process is similar to the process described above, with reference to FIG. 2. Specifically, each desired level must be associated with a unique value (step 702). The unique value may comprise a base 10 number, a binary number, a character or character string, and/or any combination thereof (Note that in cases with large numbers of levels one may want to avoid using character or character strings for performance reasons.) For example, where an entity comprises a file or file access attempt (and the collection is a user), the file or file access attempt may be associated with a level depending upon the result of the access attempt. In this example, potential levels include none, read, update (e.g., writer or alter), control, and/or execute. The levels can be used to distinguish between granted and consumed access, e.g., read attempted and read granted, read attempted and read denied, write attempted and write granted, write granted and write denied, and the like. Potential unique values for each level include, N (none), R (read), W (write), U (update), A (alter), 0 (non), 1 (read), 2 (write), 3 (update), 4 (alter). In an embodiment, encoding can be completed to capture attempted and granted access, such as RR or 11 or 1 (read attempted and read granted), RN or 10 or 0 (read attempted and none granted), WW or 22, or 2 (write attempted and write granted), WN or 20 or 3 (write attempted and none granted), etc. In certain embodiments, any value, string, and/or combination thereof may be assigned to a level or the combination of attempted versus granted, etc. The only requirement is that each level be assigned a unique identifier. As described above with reference to the entity cross-reference table (see FIG. 3), so too, the level data associated with each entity may be stored in a level cross-reference table. Exemplary level cross-reference tables are depicted at FIGS. 8A and 8B.

With further reference to FIG. 7, in order to capture level data associated with an entity (e.g., in order to capture the results of a file access attempt), each entity in a collection may be associated with an appropriate level, based upon the data contained in the level cross-reference table (step 704). This may be achieved by creating a table or array of level data, where the $n^{th}$ array element for the level is associated with the $n^{th}$ bit position for the entity in the binary representation for the entities in the associated collection. Likewise, in various embodiments, level data may be represented as an integer (e.g., a big integer) or string, where, for example, the $n^{th}$ bit position corresponds to the $n^{th}$ entity. The following example, which uses entities A, C, and D, as above with reference to FIG. 2, is illustrative.

Entities:
A: 000001
C: 000100
D: 001000
Collection 1:
A, C, D: 001101
Level Data for Entities A, C, and D:
A: 2
C: 5
D: 3
Level Data Array for Collection 1:
0|0|3|5|0|2

Thus, the level data for each entity A, C, and D in Collection 1 is stored in a level data array, where the array position corresponds to the bit position of the entity in Collection 1 with which it is associated. In certain embodiments, vertical bars may be used herein to separate level data elements in a level data array to depict the array nature of a level data array. However, in practice, a level data array may not include vertical bars. One or more level data arrays may be stored in a level data collections table, an example of which is depicted at FIG. 9. Each level data array comprising a level data collections table may, in conjunction with a level data cross-reference table, permit a variety of more advanced analyses (step 706). For example, where a collection, C1, comprises a file, and the entities assigned to C1 comprise users A, B, and C attempting to access the file, system 100 may use the process described with reference to FIG. 2 to determine that users A, B, and C accessed (or attempted to access) the file collection, and the process described with reference to FIG. 7 to determine specific details about the access attempts by users A, B, and C (e.g. read attempted, read granted, etc.)

Thus, for example, system 100 may identify potential excessive granted access that is not being used during a given time period, possible accidental or malicious attempted access, and the like.

A level data collections table may be enhanced in a variety of ways. For instance, a level data collection table may be enhanced to show periodic (e.g., hourly, daily, weekly, monthly, 90 day, annual, etc.) level data for the associated collection, which enables evaluation with more granularity. An enhanced monthly level data collections table is depicted at FIG. 10. With reference to FIG. 10, note that Day_M is merely intended to represent the final day in a period of days. So, if the period is one month, M may equal 28, 29, 30, or 31, depending upon the month and/or year. Moreover, where a period is very granular (e.g., hourly) a trending analysis may be performed by system 100 to show a real time (or almost or pseudo-real time or quasi-real time) behavior of one or more collections and/or entities. Further still, a Boolean flag may indicate whether an entity has been active (e.g., existed and/or occurred) during an interval (e.g., the last 30, 60, 90, etc. days).

A level data collections table may be further enhanced to provide a minimum or maximum array level for each associated entity for a given collection during a given period. For example, a level data collections table may include a maximum level associated with one each entity in or more collections during a given month. An exemplary summary level data collections table including this data is depicted at FIG. 11. Again, a Boolean flag may indicate whether an entity has been active (e.g., existed and/or occurred) during an interval (e.g., the last 30, 60, 90, etc. days).

In addition to providing details about an entity, level data may be leveraged to assess the risk associated with a particular entity. For example, where an entity comprises a file, and the collection associated with the entity comprises a user, level data may be leveraged to determine the risk associated with the user's file access attempts. That is, where a user attempts to access a file and access is denied (because the user does not have permission to access the file), a higher risk may be associated with the user or the user's activities. This risk may be associated with a risk level, which may be defined in any suitable manner. For example, a risk may be assigned a risk level of 1 to 10, 0 to 9, low, medium, high, etc., depending upon a variety of factors (e.g., likelihood of harm, impact of harm, etc.) This data may be stored in a risk level cross-reference table. An exemplary risk level cross-reference table is depicted at FIG. 12. Further, a risk level may be stored and associated with an entity and/or a collection in the manner described above with reference to level data. That is, each entity in a collection may be associated with a risk level by storing a risk level in a risk level collections table in the array position corresponding to the bit position of the entity in the collection with which it is associated. An exemplary risk level collections table is depicted at FIG. 13.

Further still, one or more fields, columns, arrays, and/or tables may be implemented to capture the number of transactions associated with each risk level (e.g., on an entity, collection, and/or system wide level), and this data may, for instance and in the example provided above, form the basis for a report highlighting excess user access or attempted access violations, either of which may be accidental or malicious. For example, and with reference to FIG. 14, which depicts an exemplary monthly risk level transaction count table, the $n^{th}$ array element may hold a count for the number of times that the $n^{th}$ associated entity in the collection (e.g., activity, transaction type and/or resource) has been attempted to be performed, occurred, and/or accessed. During multiple events for accessing or attempting to access a resource, transaction, system, etc., the level array may simply capture the maximum access attempted. This may ensure that the worst case (i.e., the maximum level) is identified. For example, if a user is granted ALTER accesses to a particular file and then accesses it 99 times with READ access and once with WRITE or ALTER access then the level entry in the associated array may show ALTER ATTEMPTED and ALTER GRANTED, e.g., 22, while the associated count in the risk level transaction count table (FIG. 14) would be 100. Additionally, the array elements may be broken down into separate bit maps, where there may be an indicator for the various levels and the associated counts. For example, a 64 bit array element may be used to allocate bits for different levels, with either assumed (based on position) or explicit level identifiers. Counts that exceed the maximum value may simply be left at their maximum value and not rolled to restart counting from zero. Alternatively, counts exceeding the maximum may be restarted (e.g., from zero), and a separate counter incremented each time the maximum is achieved.

With reference now to FIG. 16, a table or array 1602 is depicted which may, in various embodiments, be useful for capturing or collecting information associated with a level, an entity, a collection, and/or a time period in a single table or array. In other words, table 1602 may permit storage of both level data and event counts in a single data structure. Moreover, although table 1602 is described below with reference to collection and analysis of transaction history data (e.g., spending or purchasing history data), table 1602 may apply equally to any instance in which it is desirable to organize data according to entity, collection, level, and/or time period. For example, as described above, table 1602 may include level data associated with a number of file access attempts and/or types of file access attempts. In addition, although table 1602 is described as being useful for the storage and analysis of information associated with each of an entity, a collection, a level, and/or a time period, those of skill will appreciate that the systems and methods described above with reference to FIGS. 1-14 are also capable of capturing the same data. Similarly, in various embodiments, a one dimensional array may be formed that represents one or more entities. Such an array may comprise one or more multi-bit elements (e.g., bytes), where each element is tied to an entity and where the bits comprising each multi-bit element are associated with level data for the entity.

Thus, although those of skill in the art will recognize as described briefly above) that other structures capable of performing the same or a similar function may be constructed based upon this disclosure, in various embodiments, table 1602 may be organized such that a group of rows may comprise a single collection (e.g., customers, such as Cust1, Cust2, and Cust3, as shown, users, and the like), while each column may comprise an entity (e.g., merchants, such as M1 . . . Mx, as shown, categories of merchants or industry groups of merchants, and the like). Further, as described below, in certain embodiments, a count or level count may be associated each entity. A count or level count may be stored as a two dimensional array (e.g., as bytes and/or small integers). Thus, a first dimension of a two dimensional array for storing level counts may correspond to each of a plurality of entities (e.g., M1 . . . Mx), while a second dimension of the two dimensional array may correspond to one or more levels (e.g., L, M, H, as described below). Thus, each element in a two dimensional array may store a level count for an entity with respect to a particular level (e.g., for the $n^{th}$ entity at the $m^{th}$ level).

Further, in various embodiments, a group of columns or entities may be grouped into a particular time period (e.g., minutes, hours, days, weeks, months, etc.), and a group of rows comprising a collection may comprise level data. As discussed briefly above, level data may comprise, for example, a transaction amount or value, such as low, medium, or high (or L, M, H, as shown), a number of transactions or purchases performed by a customer collection with a merchant entity, a merchant type (e.g., discount merchant, food retail merchant, jewelry merchant, etc.), a type of file access attempt (e.g., Read, Write, etc.), and the like. In various embodiments, although many other arrangements are possible, for purposes of illustration, a low transaction (L) may comprise a transaction having a value under a first amount (e.g., $100), while a medium transaction (M) may comprise a transaction having a value between the first amount and a second amount (e.g., $100 and $500), and a high transaction (H) may comprise a transaction having a value greater than the second amount (e.g., $500).

Thus, table 1602 may be organized by entity, collection, level, and/or time period, and each coefficient or element in table 1602 may correspond to a count or tally associated with each entity in a collection at a particular level. For instance, where level data comprises a transaction amount or value, such as L, M, or H, as depicted, each element in table 1602 may comprise a number of transactions of one of these types by a particular customer collection with a particular merchant entity during a given time period. In various embodiments, and as shown, system 1500 may limit an element to a value of one or zero (e.g., based upon the assumption that a customer typically only makes one purchase from a given merchant during a single time period). However, in various embodiments, each element may simply act as a counter which may be incremented each time the customer makes a purchase from the merchant of the particular level type during the particular time period. An array dimension or element may be sized (or a size may be allocated for a particular element) based upon an expected or maximum number of bits required. Thus, in various embodiments, a structure 1602 may losslessly store data, as described herein. In addition, a count may be converted to and stored as (e.g., as described above) a binary value, which may speed data analysis and processing.

Referring to FIG. 17, a table 1702, much akin to table 1602, is shown. Table 1702 may, like table 1602, aggregate a count associated with an entity in a collection by level. Likewise, table 1702 may aggregate such a count for one or more time periods, e.g., one or more months, as shown. Thus, in various embodiments, table 1702 may aggregate one or more monthly totals, such as monthly totals for a number of transactions a customer has engaged in with a particular merchant at a particular level. In various embodiments, it may be advantageous (e.g., storage requirements may again be reduced) to remove or delete from any table summarizing a time period (e.g., table 1702, which summarizes or aggregates a total number of counts for a particular month) any level totals for a collection which are zero across all of a set of entities. For example, with regard to table 1702, it may be advantageous to remove the medium (or M) level data for Cust2, since the customer is not shown to have a transaction with any merchant entity during the month. In various embodiments, level data may be removed, as described above, with the assistance of a cross reference table formed between a summary table, such as table 1702, and a deletion table, which may track which rows (having zero values) have been removed from a table, such as table 1702. Although such an approach may, in certain embodiments, reduce a size associated with a summary table, e.g., table 1702, it may nevertheless require the creation of cross reference and deletion tables, which may require additional time and resources. Thus, in various embodiments, it may be advantageous to forgo the removal of level data from a summary table.

In various embodiments, the systems and methods discussed herein may be used for a large variety of purposes. For example, in various embodiments, each of the systems and methods may assist in the determination of one or more post purchasing opportunities, such as one or more offers (e.g., loyalty offers), one or more discounts on future purchases, one or more rewards points, and the like. Further, as described variously above, transaction history data may be manipulated and analyzed in real time and/or pseudo or near real time, such that a customer is provided a post purchasing opportunity within a short time after completing a transaction with a merchant (e.g., seemingly almost instantly, such as, within several seconds or minutes of a transaction). A customer may be provided a post purchasing opportunity, in various embodiments, in association with a same merchant from which a purchase was recently made, in association with a merchant partnered with a merchant from whom a sale was recently made (e.g., such that the merchant and partner merchant may offer cross-sales opportunities to boost sales between themselves), and/or in association with a merchant that is frequently attended or visited by the customer (e.g., to reward customer loyalty to the frequently attended merchant).

Further, in various embodiments, the systems and methods discussed herein may assist in the determination of one or more pre-purchasing opportunities. For example, a customer may indicate, prior to or during a visit to a merchant (e.g., an online visit and/or a visit to a brick and mortar store), that the customer intends to visit or is visiting the merchant, whereupon the systems and methods described herein may be used to provide an opportunity (e.g., a discount, an offer, etc.) to the customer.

Any of the opportunities described above may be provided, in various embodiments, based upon the transaction history of the customer, which may be maintained, as described herein, in a data structure such as, for example, any of the tables described above (including tables 1602 and or table 1702). Tables may be analyzed by a system (e.g., system 1502) to determine that a customer shopped at a particular merchant on a certain number of days during a month and/or that the customer shopped at merchants within a particular industry group, and a (post purchasing and/or pre-purchasing opportunity) may be determined and/or offered to the customer in accordance with the determination. For instance, where it is determined that a customer shopped with a particular merchant (e.g., a low priced merchant), as discussed above, the customer may be provided with an opportunity (e.g., a coupon or offer) associated with another or the same merchant (e.g., the low priced merchant). Further, the customer may be provided with such an opportunity in real time and/or near real time, because the systems and methods discussed herein permit the storage and manipulation of large quantities of data within a relatively short amount of time and based upon one or more logical or bitwise operations.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, facebook, twitter, MMS, data communication over a financial acquirer network, and/or other type of communication technology. In various embodiments, a channel may be hosted or provided by a data partner.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user data, file system data, client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (e.g., MySQL) (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data Set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit or monitor only certain individuals, levels of employees, companies, or other entities accessing data sets, or to permit or monitor access to specific data sets based on the transaction, merchant, issuer, user or the like. Furthermore, the security information may restrict, permit, and/or monitor only certain actions such as accessing, modifying, and/or deleting data sets. In one example, the data set annotation may indicate or track that only the data set owner or the user are permitted to delete a data set, various identified users may be permitted to access the data set for reading, and others are altogether excluded from accessing the data set. However, other access restriction or monitoring may also be used which may allow various entities to access a data set with various permission levels as appropriate, and/or which monitoring may also be used to track various entities (e.g., users or systems) accessing a data set with various permission levels. Thus, in various embodiments, tracking information may enable a system administrator to inquire into one or more user activities, which inquiry may permit the system administrator to adjust one or more access controls, modify one or more user groups or transaction clusters, and the like.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., AES, Twofish, RSA, El Gamal, Schorr signature, DSA, PGP, GPG (OnuPU) ECC, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML, documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like, A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular or mobile telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the AMERICAN EXPRESS, VISANET and the VERIPHONE networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an interne based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean one and only one unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

Phrases and terms similar to "account", "account number", "account code" or "consumer account" as used herein, may include any device, code (e.g., one or more of an authorization/access code, personal identification number ("PIN"). Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RED reader) in RF communication with the transponder (which may include a fob), or communications between an initiator and a target enabled by near field communications (NFC). Typical devices may include, for example, a key ring, tag, card, cell or mobile phone, wristwatch or any such form capable of being presented for interrogation. Moreover, the system, computing unit or device discussed herein may include a "pervasive computing device," which may include a traditionally none computerized device that is embedded with a computing unit. Examples may include watches. Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RED reader; and/or near field communication (NFC) technologies. For more information regarding NFC, refer to the following specifications all of which are incorporated by reference herein: ISO/IEC 18092/ECMA-340, ISO 14443, Near Field Communication Interface and Protocol-1 (NFCIP-1); ISO/IEC 21481/ECMA-352, Near Field Communication interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include, for example, consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant, location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments, A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant hank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method comprising:
    determining, by a computer system, for each of a plurality of customer transactions, a level of the transaction from among a plurality of levels, wherein the plurality of levels are based on transaction value;
    determining, by the computer system, a customer associated with each of the plurality of customer transactions, wherein a plurality of customers are associated with the plurality of customer transactions;
    counting and maintaining, by the computer system, for the plurality of customer transactions, a number of transactions at each level in the plurality of levels, for each customer of the plurality of customers and for each of a plurality of merchants, over a first time period; and
    causing, by the computer system, an offer to be provided to one of the plurality of customers based on the counting.

2. The method of claim 1, further comprising aggregating, from multiple additional time periods, counts of a number of transactions at each level in the plurality of levels, for each customer of the plurality of customers at each of the plurality of merchants.

3. The method of claim 1, wherein the offer is usable at one of the plurality of merchants.

4. The method of claim 1, wherein said counting includes determining that a count of transactions for at least one of the plurality of levels, one of the plurality of customers, and one of the plurality of merchants over the first time period is zero.

5. The method of claim 1, wherein the offer is associated with a first merchant and wherein the offer is based upon a count indicating one or more transactions by the customer with a second merchant.

6. The method of claim 1, wherein said causing the offer to be provided is further based on an indication that the one of the plurality of customers is visiting a merchant associated with the offer.

7. The method of claim 1, wherein said counting is performed in real time relative to the customer transactions.

8. A non-transitory computer-readable storage medium having instructions stored thereon that are executable by a computing device to perform operations comprising:
    determining, for each of a plurality of customer transactions, a level of the transaction from among a plurality of levels, wherein the plurality of levels are based on transaction price;
    determining a customer associated with each of the plurality of customer transactions;
    counting, for the plurality of customer transactions, a number of transactions at each level in the plurality of levels, for each customer of a plurality of customers and for each of a plurality of merchants, over a first time period; and
    causing an offer to be provided to one of the plurality of customers based on the counting.

9. The non-transitory computer-readable storage medium of claim 8, further comprising aggregating, over multiple additional time periods, counts of a number of transactions at each level in the plurality of levels, for each customer of the plurality of customers and for each of the plurality of merchants.

10. The non-transitory computer-readable storage medium of claim 8, wherein counts for each merchant are maintained at a position in an array, wherein each position is based on a power of two assigned to a corresponding merchant.

11. The non-transitory computer-readable storage medium of claim 8, wherein said causing the offer to be provided is further based on determining that a transaction occurred at one of the plurality of merchants during a particular time interval.

12. The non-transitory computer-readable storage medium of claim 8, wherein the offer is associated with a first merchant and wherein the offer is based upon a count indicating a transaction by the customer with a second merchant.

13. The non-transitory computer-readable storage medium of claim 8, wherein said causing the offer to be provided is further based on an indication that the one of the plurality of customers is located near a merchant associated with the offer.

14. The non-transitory computer-readable storage medium of claim 8, wherein said counting occurs in near real time relative to the customer transactions.

15. A system comprising:
one or more processor;
a tangible, non-transitory memory having instructions stored thereon that are executable by the one or more processors to perform operations comprising:
determining, for each of a plurality of customer transactions, a level of the transaction from among a plurality of levels, wherein the plurality of levels are based on transaction value;
determining a customer associated with each of the plurality of customer transactions, wherein a plurality of customers are associated with the plurality of customer transactions;
counting and storing, for the plurality of customer transactions, a number of transactions at each level in the plurality of levels, for each customer of the plurality of customers at each of a plurality of merchants, over a first time period; and
causing an offer to be provided to one of the plurality of customers based on the counting.

16. The system of claim 15, further comprising aggregating the counting over multiple time periods.

17. The system of claim 15, wherein the offer is usable at a merchant that is not included in the plurality of merchants.

18. The system of claim 15, wherein said counting includes determining that a number of transactions for at least one of the plurality of levels, one of the plurality of customers, and one of the plurality of merchants over the first time period is zero.

19. The system of claim 15, wherein the offer is associated with a first merchant and wherein the offer is based upon a count indicating a transaction by the customer with a second merchant.

20. The system of claim 15, wherein said counting is performed for each transaction within 60 seconds of the transaction occurring.

* * * * *